3,083,195
5-(4-AMINO-1-NAPHTHYLAZO)-2,4-
PYRIMIDINEDIOL
Edward F. Elslager, Ann Arbor, Mich., assignor to Parke, Davis & Company, Detroit, Mich., a corporation of Michigan
No Drawing. Filed Mar. 14, 1960, Ser. No. 14,567
4 Claims. (Cl. 260—154)

The present invention relates to new organic compounds possessing anti-parasitic properties and to processes for the preparation thereof. More particularly, it relates to the compound 5-(4-amino-1-naphthylazo)-2,4-pyrimidinediol which has in the free base form the formula

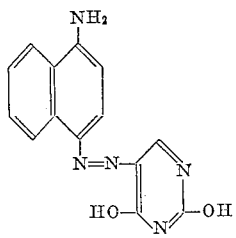

and to non-toxic, pharmaceutically-acceptable acid-addition salts thereof.

In accordance with the invention, the novel 5-(4-amino-1-naphthylazo)-2,4-pyrimidinediol and non-toxic salts thereof are prepared by the condensation of α-naphthyl amine with a 2,4-pyrimidinediol-5-diazonium salt of the formula

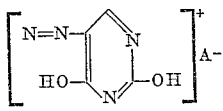

where A⁻ is one equivalent of an anion of an acid; a mineral acid is preferred, although other inorganic and organic acids can be used. In carrying out this condensation it is generally satisfactory to employ substantially equivalent quantities of the reactants in the presence of a suitable solvent. Suitable solvents for the reaction are aqueous mixtures of lower molecular weight alcohols such as methanol, ethanol, and the like. The time and temperature of the reaction are not critical; however, a temperature less than 15° C. is preferred.

The 2,4-pyrimidinediol-5-diazonium salts of the above formula are conveniently prepared in situ prior to the coupling with α-naphthylamine by the addition of an alkali nitrite such as e.g. sodium nitrite to an acidic solution of 5-amino-2,4-pyrimidinediol at a temperature preferably less than 5° C. Solvents suitable for the reaction are aqueous mixtures of water-miscible alcohols such as ethanol, propanol and the like.

As mentioned above, the novel 5-(4-amino-1-naphthylazo)-2,4-pyrimidinediol and its acid-addition salts possess valuable anti-parasitic properties. More particularly, the compounds of the invention are active against *Schistosoma mansoni*, the causative agent of schistosomiasis.

The non-toxic, pharmaceutically-acceptable acid-addition salts of the invention are formed by the reaction of the free base with a variety of pharmaceutically acceptable, inorganic and organic acids. Some examples of the many organic and inorganic acids which can be used to produce the corresponding acid-addition salts are hydrochloric, hydrobromic, hydroiodic, sulfuric, phosphoric, oxalic, cholic, sulfamic, naphthalene-1,5-disulfonic, phenoxyacetic, lactic, tartaric, gluconic, alginic, citric, succinic, maleic, malonic, adipic, mandelic, oleic, tannic, ethylsulfuric, penicillic, benzoic, 5,5'-naphthalenedisalicylic, 3- and 5-phenylsalicylic, 3-hydroxy-2-naphthoxy, 4,4'-methylenebis-(3-hydroxy-2-naphthoxy), 1,4,5,8-naphthalenetetracarboxylic, 4-biphenylcarboxylic, terephthalic, pyromellitic, 8-hydroxy-7-iodo-5-quinolinesulfonic, cyclopentylpropionic, cyclohexanecarboxylic, arsanilic, arsonic acid and the like.

The invention is illustrated by the following examples:

*Example 1*

50.8 g. (0.4 mole) of 5-amino-2,4-pyrimidinediol is dissolved in 500 ml. of a mixture of 50% aqueous ethanol and 90 ml. of concentrated hydrochloric acid and the solution cooled to —5° C. 27.6 g. (0.4 mole) of sodium nitrite dissolved in 120 ml. of water is added with stirring to the reaction mixture and stirring continued for 15 minutes at 0° C. The reaction mixture is added during a period of 10 minutes to a solution of 57.2 g. (0.4 mole) of α-naphthylamine in 500 ml. of 95% ethanol. Stirring is continued an additional hour at 0–5° C. The pH of the reaction mixture is adjusted to approximately 8 by the addition of sodium hydroxide solution, and the 5-(4-amino-1-naphthylazo)-2,4-pyrimidinediol which precipitates is collected by filtration and washed with water. After recrystallization from an N,N-dimethyl acetamide-water mixture, the product melts at 252–253° C. (dec.).

*Example 2*

4.0 g. of 5-(4-amino-1-naphthylazo)-2,4-pyrimidinediol is dissolved in boiling ethanol and the solution filtered into 200 ml. of ethanolic hydrogen chloride. The reaction mixture is heated to boiling and allowed to cool overnight. The 5-(4-amino-1-naphthylazo)-2,4-pyrimidinediol hydrochloride is collected by filtration and dried in vacuo at 65° C.

*Example 3*

15.0 g. of 5-(4-amino-1-naphthylazo)-2,4-pyrimidinediol and 9.7 g. of pamoic acid (2,2'-dihydroxy-1,1'-dinaphthylmethane-3,3'-dicarboxylic acid) are dissolved in 2.5 l. of N,N-dimethylformamide. The solution is cooled to about 10° C. and poured slowly with vigorous stirring into 7.5 l. of cold water. The 5-(4-amino-1-naphthylazo)-2,4-pyrimidinediol pamoate is collected by filtration, washed successively with water and methanol, and dried in vacuo.

What is claimed is:
1. A member of the class consisting of 5-(4-amino-1-naphthylazo)-2,4-pyrimidinediol and acid-addition salts thereof with pharmaceutically-acceptable acids.
2. 5-(4-amino-1-naphthylazo)-2,4-pyrimidinediol.
3. 5-(4-amino-1-naphthylazo) - 2,4 - pyrimidinediol hydrochloride.
4. 5-(4-amino-1-naphthylazo)-2,4-pyrimidinediol salt of 2,2' - dihydroxy - 1,1' - dinaphthylmethane - 3,3' - dicarboxylic acid.

References Cited in the file of this patent
UNITED STATES PATENTS

| | | |
|---|---|---|
| 2,430,439 | Winneck et al. | Nov. 4, 1947 |
| 2,980,665 | Langley | Apr. 18, 1961 |

FOREIGN PATENTS

| | | |
|---|---|---|
| 556,218 | Canada | Apr. 22, 1958 |